(12) United States Patent
Olmstead

(10) Patent No.: US 10,348,418 B1
(45) Date of Patent: Jul. 9, 2019

(54) TRANSIENT AND SPURIOUS SIGNAL FILTER

(71) Applicant: Esker Technologies, LLC, Mequon, WI (US)

(72) Inventor: Brian S Olmstead, Bayside, WI (US)

(73) Assignee: Esker Technologies, LLC, Mequon, WI (US)

( * ) Notice: Subject to any disclaimer, the term of this patent is extended or adjusted under 35 U.S.C. 154(b) by 217 days.

(21) Appl. No.: 14/716,380

(22) Filed: May 19, 2015

Related U.S. Application Data

(60) Provisional application No. 62/027,587, filed on Jul. 22, 2014.

(51) Int. Cl.
*H04B 15/00* (2006.01)
*H04B 3/54* (2006.01)

(52) U.S. Cl.
CPC ............. *H04B 15/00* (2013.01); *H04B 3/542* (2013.01)

(58) Field of Classification Search
None
See application file for complete search history.

(56) References Cited

U.S. PATENT DOCUMENTS

| | | |
|---|---|---|
| 2,990,482 A | 6/1961 | Morris |
| 2,996,652 A | 8/1961 | Cassell |
| 3,139,585 A | 6/1964 | Ross |
| 3,678,341 A | 7/1972 | Constable |
| 4,523,307 A | 6/1985 | Brown et al. |
| 4,639,609 A | 1/1987 | Floyd et al. |
| 4,749,992 A | 6/1988 | Fitzemeyer et al. |
| 4,823,383 A * | 4/1989 | Cardot .............. H01R 13/6666 333/177 |
| 5,040,168 A | 8/1991 | Maue et al. |
| 5,142,278 A * | 8/1992 | Moallemi ........... B61L 15/0036 307/10.1 |
| 5,148,144 A * | 9/1992 | Sutterlin ............... H04B 3/548 340/12.36 |
| 5,353,189 A * | 10/1994 | Tomlinson ............. G08G 1/042 361/111 |

(Continued)

FOREIGN PATENT DOCUMENTS

| | | |
|---|---|---|
| EP | 0659613 | 5/1995 |
| EP | 1383280 | 1/2004 |

(Continued)

OTHER PUBLICATIONS

Joe Klinger, Phone Line Basics: Revisited, Mar. 2002, Radio Guide Magazine, accessed from www.jkaudio.com/article_10.htm on Oct. 10, 2017.*

(Continued)

*Primary Examiner* — Thomas J. Hiltunen
(74) *Attorney, Agent, or Firm* — Ryan Kromholz & Manion, S.C.

(57) ABSTRACT

An improved filter for communications over a power bus may provide it to or minimize the effect of voltage spikes on a power line and/or may filter a power line signal with high pass and low pass filters to allow communicative signal reception on noisy power lines, and/or may filter a communicative signal transmitted from a radio modem with low pass filters to prevent high frequency harmonics and spurious signals from being conducted into and thereafter radiated from the power line.

12 Claims, 6 Drawing Sheets

(56) References Cited

U.S. PATENT DOCUMENTS

| | | | |
|---|---|---|---|
| 5,488,352 A | 1/1996 | Jasper | |
| 5,625,894 A * | 4/1997 | Jou | H04B 1/52 333/103 |
| 5,694,109 A | 12/1997 | Nguyen | |
| 5,727,025 A | 3/1998 | Maryanka | |
| 5,739,592 A | 4/1998 | Rigsby et al. | |
| 5,745,027 A | 4/1998 | Malville | |
| 5,812,557 A | 9/1998 | Stewart et al. | |
| 5,870,016 A * | 2/1999 | Shrestha | H04B 3/54 340/12.33 |
| 5,900,803 A | 5/1999 | Politz et al. | |
| 6,006,143 A | 12/1999 | Bartel et al. | |
| 6,127,939 A | 10/2000 | Lesesky et al. | |
| 6,137,880 A * | 10/2000 | Bella | H04M 11/062 379/399.01 |
| 6,167,121 A * | 12/2000 | Arai | H04L 25/0266 379/90.01 |
| 6,229,432 B1 | 5/2001 | Fridley et al. | |
| 6,229,434 B1 | 5/2001 | Knapp et al. | |
| 6,252,755 B1 * | 6/2001 | Willer | H04B 3/56 361/113 |
| 6,356,426 B1 | 3/2002 | Dougherty | |
| 6,373,377 B1 | 4/2002 | Sacca et al. | |
| 6,392,368 B1 | 5/2002 | Deller et al. | |
| 6,393,064 B1 | 5/2002 | Nagai et al. | |
| 6,400,103 B1 | 6/2002 | Adamson | |
| 6,411,203 B1 | 6/2002 | Lesesky et al. | |
| 6,418,221 B1 * | 7/2002 | Snow | H04L 27/0002 379/399.01 |
| 6,434,459 B2 | 8/2002 | Wong et al. | |
| 6,453,687 B2 | 9/2002 | Sharood et al. | |
| 6,507,158 B1 | 1/2003 | Wang | |
| 6,512,307 B1 * | 1/2003 | Ilg | B60R 16/03 307/10.1 |
| 6,608,554 B2 | 8/2003 | Lesesky et al. | |
| 6,629,032 B2 | 9/2003 | Akiyama | |
| 6,731,201 B1 | 5/2004 | Bailey et al. | |
| 6,744,352 B2 | 6/2004 | Lesesky et al. | |
| 6,759,946 B2 | 7/2004 | Sahinoglu et al. | |
| 6,771,774 B1 * | 8/2004 | Phan | H04L 25/0288 379/399.01 |
| 6,799,814 B2 | 10/2004 | Lesesky et al. | |
| 6,800,957 B2 | 10/2004 | Nerone et al. | |
| 6,842,108 B2 | 1/2005 | Akiyama et al. | |
| 6,842,668 B2 | 1/2005 | Carson et al. | |
| 6,853,724 B2 * | 2/2005 | Wang | H04M 1/76 379/387.02 |
| 6,882,125 B2 * | 4/2005 | Kameda | G05B 19/19 318/560 |
| 6,895,089 B2 * | 5/2005 | Wang | H04M 1/76 379/387.01 |
| 6,933,752 B2 | 8/2005 | Dreps | |
| 6,970,772 B2 | 11/2005 | Radtke et al. | |
| 7,010,050 B2 | 3/2006 | Maryanka | |
| 7,042,339 B2 | 5/2006 | Bruccoleri et al. | |
| 7,046,124 B2 * | 5/2006 | Cope | H04B 3/56 307/3 |
| 7,117,272 B2 | 10/2006 | Rimboim | |
| 7,245,201 B1 | 7/2007 | Kline | |
| 7,286,026 B2 * | 10/2007 | Law | H04B 3/56 333/124 |
| 7,286,044 B2 | 10/2007 | Yanagida et al. | |
| 7,307,520 B2 | 12/2007 | Lamon et al. | |
| 7,339,458 B2 * | 3/2008 | Cern | H04B 3/56 340/12.37 |
| 7,545,178 B2 | 6/2009 | Hung | |
| 7,741,960 B1 | 6/2010 | Hoogenakker et al. | |
| 7,752,472 B2 | 7/2010 | Diab | |
| 7,852,206 B2 | 12/2010 | Yanagida et al. | |
| 7,859,397 B2 | 12/2010 | Lamon et al. | |
| 7,921,308 B2 | 4/2011 | Dhuyvetter | |
| 8,154,150 B2 * | 4/2012 | Sakai | H04B 3/548 307/1 |
| 8,154,153 B2 | 4/2012 | Yang et al. | |
| 8,179,655 B2 * | 5/2012 | Wedley | H04M 19/005 361/111 |
| 8,442,127 B2 | 5/2013 | Stadelmeier et al. | |
| 8,527,135 B2 | 9/2013 | Lowrey et al. | |
| 8,541,903 B2 | 9/2013 | Burk | |
| 8,543,008 B2 * | 9/2013 | Soto | H04M 19/08 398/171 |
| 8,594,314 B2 * | 11/2013 | Kitchin | H04M 19/005 379/324 |
| 8,638,216 B2 | 1/2014 | Lamon et al. | |
| 8,693,151 B2 * | 4/2014 | Iwasa | H03H 7/0107 361/56 |
| 9,172,433 B2 * | 10/2015 | Schwager | H04B 3/56 |
| 9,356,796 B2 * | 5/2016 | Shapson | H04L 12/2838 |
| 9,379,919 B2 * | 6/2016 | Lin | H04L 25/0278 |
| 9,515,747 B2 * | 12/2016 | Soto | H04B 10/808 |
| 9,537,644 B2 | 1/2017 | Jones | |
| 9,779,720 B2 | 10/2017 | Lee | |
| 9,787,362 B2 * | 10/2017 | Varadarajan | H04B 3/56 |
| 10,069,650 B2 * | 9/2018 | Munoz et al. | H04L 12/6418 |
| 10,122,412 B2 * | 11/2018 | Scott | H05B 33/0803 |
| 2002/0079121 A1 | 6/2002 | Ryan | |
| 2003/0076221 A1 | 4/2003 | Akiyama et al. | |
| 2004/0258141 A1 * | 12/2004 | Tustison | H04B 3/548 375/219 |
| 2008/0013637 A1 * | 1/2008 | Kodama | H04B 3/54 375/260 |
| 2009/0134718 A1 | 5/2009 | Hurst | |
| 2010/0061545 A1 * | 3/2010 | Kitchin | H04M 19/005 379/413 |
| 2011/0279935 A1 * | 11/2011 | Iwasa | H03H 7/0107 361/56 |
| 2012/0177133 A1 * | 7/2012 | Oldenkamp | H04B 3/54 375/257 |
| 2013/0223293 A1 | 8/2013 | Jones | |
| 2014/0265551 A1 * | 9/2014 | Willis | H04B 3/548 307/2 |
| 2015/0065039 A1 * | 3/2015 | Nii | H04B 3/56 455/41.1 |
| 2016/0351327 A1 * | 12/2016 | Shigematsu | H01C 7/12 |
| 2017/0040968 A1 * | 2/2017 | Igarashi | H03H 7/427 |
| 2017/0093230 A1 * | 3/2017 | Yundt | H04B 3/548 |
| 2017/0310306 A1 | 10/2017 | Tanghe | |

FOREIGN PATENT DOCUMENTS

| | | |
|---|---|---|
| JP | 02005123960 | 5/2005 |
| WO | WO02/052745 | 7/2002 |
| WO | WO2004/055994 | 7/2004 |

OTHER PUBLICATIONS

Office Action dated Aug. 29, 2006 regarding U.S. Appl. No. 11/227,376, 10 pages.

Office Action dated May 8, 2007 regarding U.S. Appl. No. 11/227,376, 8 pages.

Office Action dated Feb. 18, 2010 regarding U.S. Appl. No. 12/001,123, 7 pages.

Office Action dated Oct. 18, 2017 regarding U.S. Appl. No. 15/287,470, 10 pages.

\* cited by examiner

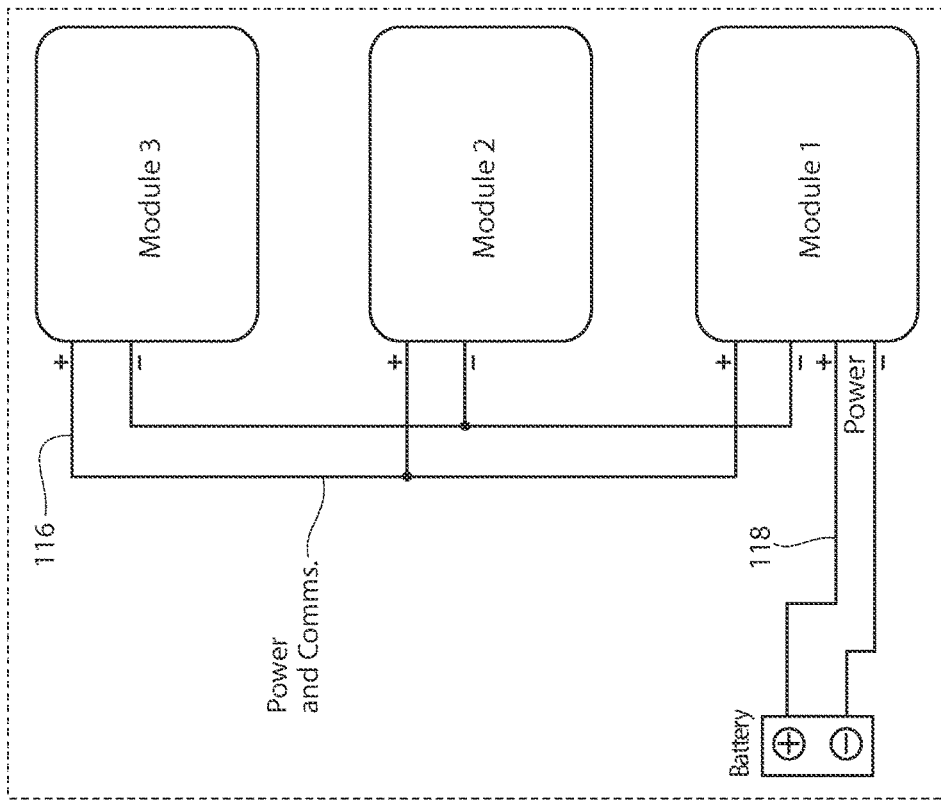
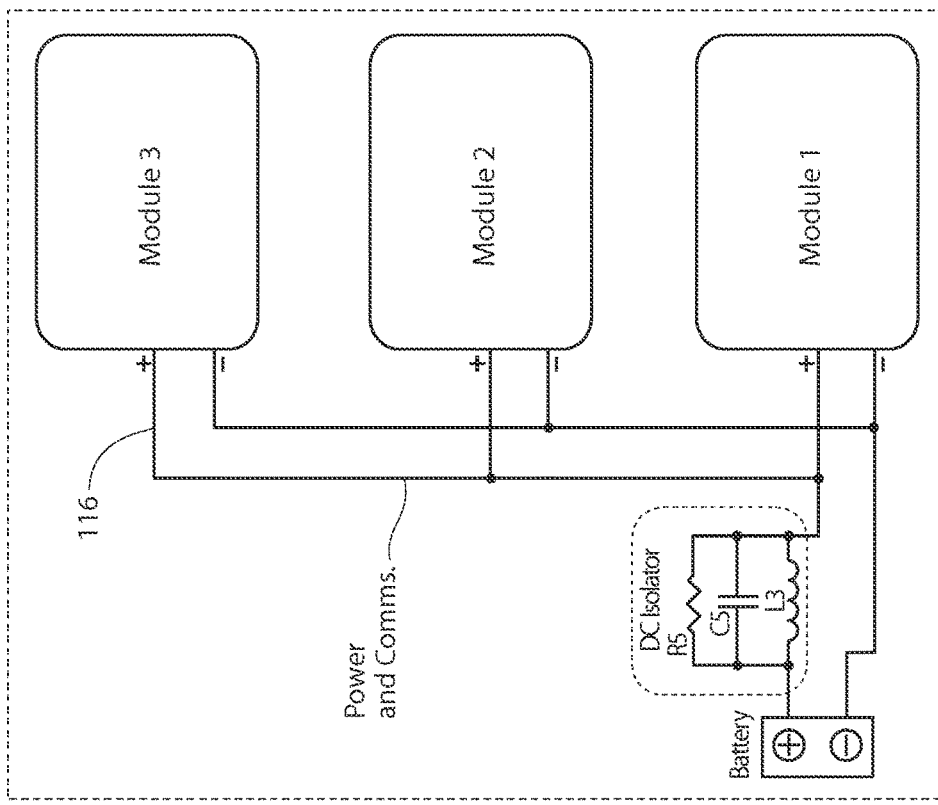
Fig. 3A
Fig. 3B

TRANSIENT AND SPURIOUS SIGNAL FILTER

RELATED APPLICATION

This application claims the benefit of co-pending provisional application Ser. No. 62/027,587 filed 22 Jul. 2014, and entitled "Transient and Spurious Signal Filter," which is incorporated herein by reference in its entirety.

BACKGROUND OF THE INVENTION

In electrical communications, as with any communications generally, clarity is key. Clarity may be difficult to achieve in a variety of environments in which clear communications are critical. For instance, communications at radio frequencies over direct current (DC) power busses is known. In some instances, however, reliability of such communications is interrupted by environmental noise and/or voltage spikes occurring on the power bus. Accordingly, the art of communications over or along a DC power bus may be enhanced by better filtering techniques.

SUMMARY OF THE INVENTION

A filter according to the present invention provides enhanced filtering of transient and spurious signals which may otherwise interfere with a communication signal. Such filter may be advantageously used in wired, noisy communication environments, such as communication environments provided on vehicles (e.g., automobiles, airplanes, boats, locomotives).

Systems according to the present invention may include one or more application modules, preferably each of which includes a filter according to the present invention. Systems according to the present invention may employ a single bus, which combines power and communications on a single channel (e.g., wired channel) or multiple busses where one or more busses each carry only power supply current and one or more busses each of which conveys both power and a communications signal.

According to an aspect of an embodiment of an electrical circuit according to the present invention, the circuit has a signal line configured to conduct an electrical signal, and a band-pass filter arrangement, which preferably includes a high-pass filter and a low pass-filter. The high-pass filter may be connected to the signal line, the filter being capable of removing low-frequency components of the electrical signal below a predetermined low-frequency threshold (e.g. about 1 MHz). The low-pass filter may be connected to the high-pass filter, the filter being capable of removing h frequency components of the electrical signal above a predetermined high-frequency threshold (e.g. 10 MHz), The circuit preferably also includes a first voltage clamp connected to the low-pass filter, the clamp being capable of clamping a voltage level of the electrical signal at a maximum predetermined threshold voltage. A common mode choke may also be connected to the first voltage clamp.

According to another aspect of an embodiment an electrical circuit according to the present invention, such circuit may include a radio modem coupled to the choke.

According to still another aspect of an embodiment of an electrical circuit according to the present invention, such circuit may include a second clamp capable of clamping electrically fast transient pulse components of the electrical signal. The second claim may be connected in the circuit between the low-pass filter and the high-pass filter.

According to yet another aspect of an embodiment of an electrical circuit according to the present invention, the circuit may include a direct current isolator connected to the signal line and capable of supplying a direct current to a load.

According to an aspect of an embodiment of a method according to the present invention, the method may be used for conditioning an electrical signal. The method includes the step of receiving an electrical signal and a plurality of conditioning steps. In a first conditioning step, low-frequency components of the electrical signal below a predetermined low-frequency threshold may be removed to deliver a filtered signal. In a second conditioning step, high-frequency components of the filtered signal above a predetermined high-frequency threshold may be removed to deliver a banded signal. In a third conditioning step, a voltage level of the banded signal may be clamped at a maximum predetermined threshold voltage to deliver a clamped signal. In a fourth conditioning step, circuit noise may be isolated from the clamped signal to deliver a communications signal, which may be delivered to a radio modem.

According to another aspect of an embodiment of a method according to the present invention, the first conditioning step may further include the step of clamping electrically fast transient pulse components of the electrical signal. Direct current may be isolated from the electrical signal and delivered to a load, which may be a radio modem.

According to an aspect of an embodiment of a system according to the present invention, the system may include a plurality (e.g., 2, 3, 4, etc.) of electrical circuits according to the invention, wherein each signal line of each of the plurality of electrical circuits is electrically connected to the signal line of every other electrical circuit. The plurality of electrical circuits may be carried by a vehicle, such as a military vehicle n or emergency response vehicle. If the circuits are carried on a vehicle, it is preferred that at least one of the electrical circuits is capable of controlling the operation of lamp (e.g., headlamps, running lamps, break lamps, warning lamps, etc.) power on the vehicle.

BRIEF DESCRIPTION OF THE DRAWINGS

FIG. 3A is a first schematic of several communications modules coupled to a combination power/communications bus.

FIG. 3B is a second schematic of several communications modules coupled to a combination power/communications bus.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
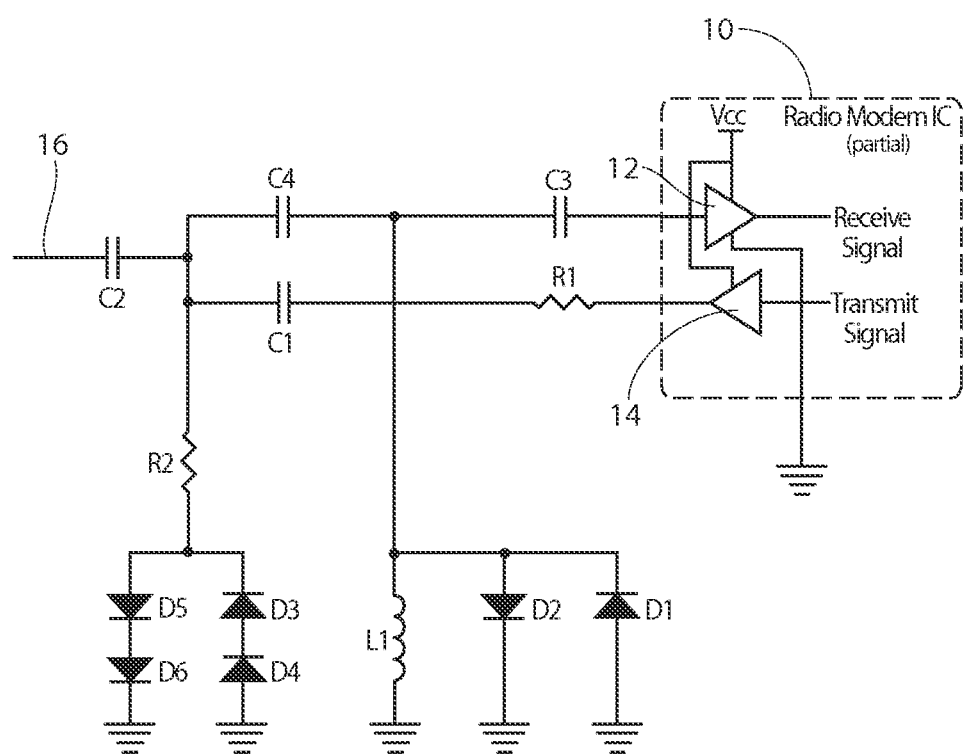
FIG. 1 depicts a schematic of a prior art filter.

Turning now to the figures, a prior filter arrangement can be seen in FIG. 1. Generally, the filter allowed passage of a substantially unattenuated radio frequency (RF) communication signal from and to a radio modem 10 including a receiver 12 and a transmitter 14. A received RF signal was delivered to the circuit on a preferably wired signal line 16, which was coupled to the receiver 12 through three capacitors, C2, C3, and C4. An RF signal could be transmitted by being delivered to the same signal line 16, coupled to the transmitter 14 through C2, C1, and a resistor R1. Accordingly, while some low frequency filtering of a received signal prior to reaching the receiver 12, and a transmitted signal after leaving the transmitter 14, may have been achieved by the prior design, transient and spurious signals provided on the signal line 16 were still a problem, especially in noisy operating environments.

Figure 2:
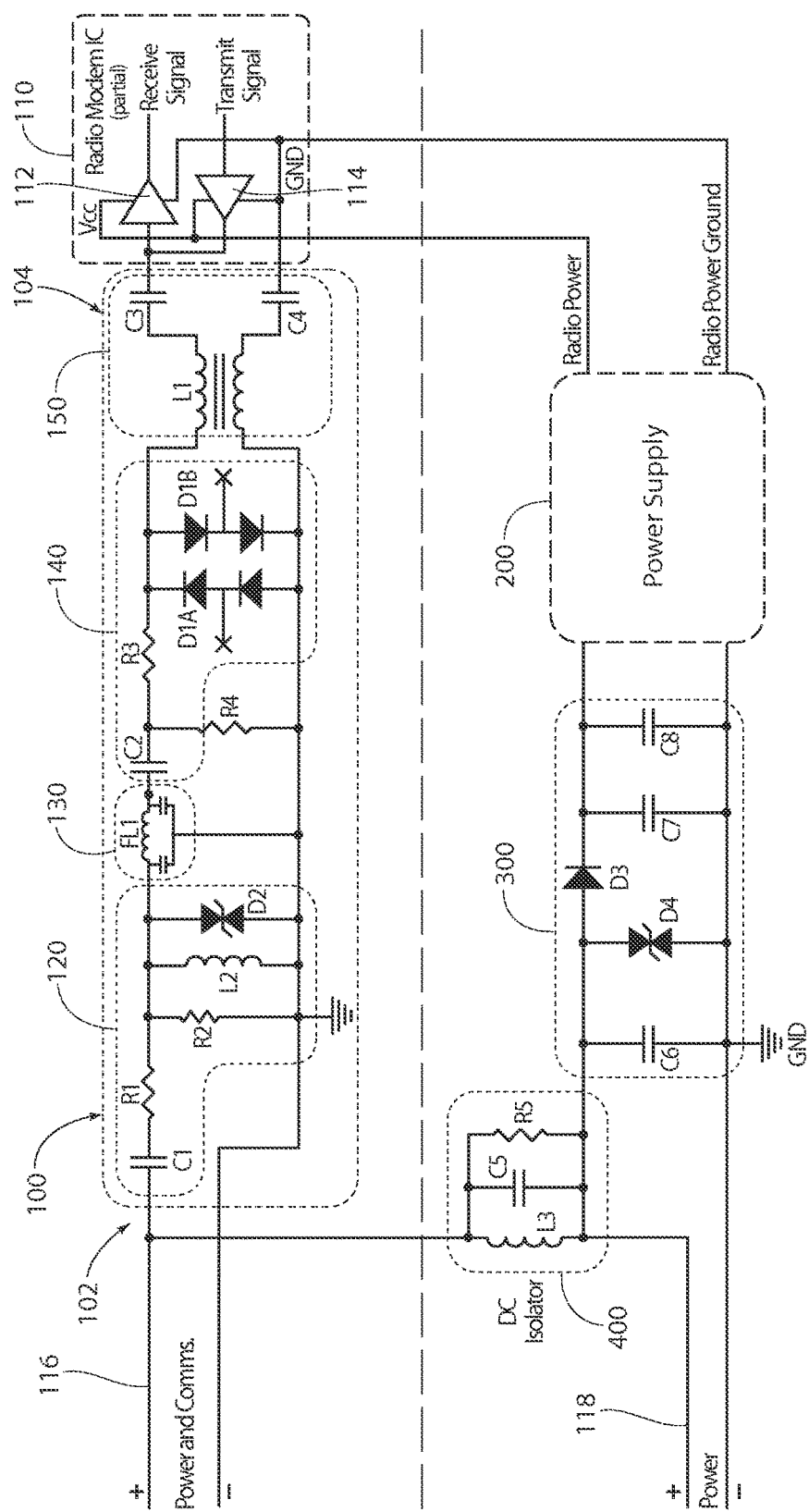
FIG. 2 depicts a schematic of a filter according to the present invention.

Turning now to FIG. 2, a schematic is provided of a portion of an application circuit including filter 100 according to the present. invention. Generally, the circuit includes a radio modem 110, similar or identical to the radio modem 10 of FIG. 1. The filter 100 according to the present invention is connected to the radio modem 110. Generally, the preferred filter 100 includes a high pass filter and electrically fast transient (EFT) clamp 120, a low-pass filter 130, a secondary voltage clamp 140, and a common mode choke 150. When used herein, the phrase "electrically fast transient" or "EFT" references electrically fast transients as those terms are understood in the art, such as those discussed in International Engineering Consortium (IEC) standard 61000 or International Standards Organization (ISO) standard 7637. A transient is generally a voltage spike that lasts about 3 nanoseconds to about 200 nanoseconds, and a burst or transients generally includes a plurality of transients that may be spaced from about 8 microseconds to about 250 microseconds, and a burst may last for about 600 microseconds to about 18 milliseconds. Consecutive bursts may be separated by as little as 200 milliseconds or as much as 400 milliseconds. The filter 100 is connected on a line end 102 to a communication signal line 116 and on a radio end 104 to the radio modem 110. The high pass filter and EFT clamp 120 is preferably connected to the communication signal line 116. High pass filter functionality is provided by components C1, R1, and L2, and allows passage of signals above a first predetermined frequency (such as above about 1 MHz), or within a predetermined frequency range to be used for communications, such as about 1 MHz to about 10 MHz. This filter maintains communicability when high amplitude, low frequency signals are present on the communication line 116. Absent this filter, communications may otherwise be lost upon receipt of such high amplitude, low frequency signs because diodes D2, D1A, and D1B would clamp such signals. An example of such high amplitude, low frequency signal that may be filtered by this high pass filter is vehicular alternator noise or whine, such as that experienced in an automobile. The EFT clamping functionality is provided by C1, R1, and D2. These components preferably are relatively high voltage, high power components to provide such functionality. C1 couples the EFT pulse into R1 which provides a current limit and power dissipation function. Then R1 couples the pulse into D2 which clamps the voltage and dissipates the remaining pulse energy.

The low pass filter 130 is preferably connected to the high pass filter/EFT clamp 120 on a circuit side opposite the connection to the communication signal line 116. The filter 130 (which is preferably an LC low pass filter) preferably passively operates on both transmitted and received signals to allow passage of signals below a second predetermined frequency, such as in the second harmonic frequency of the lowest frequency intended to be used for communications.

The secondary voltage clamp 140 is preferably connected to the low pass filter 130 on a circuit side of the filter 130 opposite the connection of the filter 130 to the high pass filter/EFT clamp 120. The secondary voltage clamp 140 (C2, R3, D1A, and D1B) operates to keep all voltage spikes from EFT below a predetermined threshold voltage, spikes above which could damage the radio modem 110. The clamp 140 may include a bias resistor R4, which assists in maintaining clamp threshold voltages at least substantially centered, even in the presence of leakage currents.

The common mode choke 150 is preferably connected to the secondary voltage clamp 140 on a circuit side of the clamp 140 opposite the connection of the clamp 140 to the low pass filter 130. The choke 150 is also preferably connected on its opposite circuit side to the radio 10. The choke 150 (including C3 and C4) isolates power supply current (usually direct current) from communication currents (usually alternating current) when both such currents are provided on the same communication signal line 116. Thus, for communication signals transmitted from the radio 10, the choke 150 prevents higher frequency communication signals from spreading to other portions of the circuit or circuit board on which the filter 100 is mounted. For communications to be received by the radio 10, the choke 150 prevents noise from the circuit, or circuit board on which the filter 100 is mounted, from interfering with the communications signal provided to the receiver 112.

The circuit may include additional circuitry (which may be mounted on the same circuit board, or a different circuit board preferably within the same environmental enclosure, as the filter 100), such as a n power supply 200, additional transient protection 300, a direct current isolator or resonator 400, and/or other applications specific circuitry (not shown). The power supply 200 may be configured to supply power to the radio 110 or to loads via a power bus 118. The power bus 118 may serve as either an input or an output. An example of input functionality may be if the bus 118 is connected to a battery, which powers the application circuitry and powers the communications bus through the isolator 400. An example of output power bus 118 functionality may be when a powered communications bus 116 is provided, such as being connected to a battery (not shown). Then the power bus output 118 could be used to power any external DC load as mentioned. Transient protection components 300 for the application circuitry (e.g. 200, 400) may be determined by characteristics of load dump transients, reverse battery transients, and other transients that may be peculiar to an application. Capacitor C6 may be sized for electrostatic discharge (ESD) protection and to generally provide low alternating current (AC) impedance across the power bus. Sometimes, a load dump diode D4 and/or a reverse protection diode D3 will be used, as shown. Capacitors C7 and C8 provide energy storage and a low impedance as required by the power supply 200.

The power bus isolator 400 includes an RLC circuit with L3, C5, and R5. The isolator 400 keeps power line impedance high enough to allow the communications signal to travel along all intended paths and be received at other communications modules coupled to the bus with a high enough voltage to be detected with minimal errors. Components L3 and C5 are resonant at a frequency preferably near the frequency of communications traffic on the communications bus 116 while R5 lowers the Q to prevent ringing during transient events.

FIG. 3A provides a wiring topology incorporating a plurality of electrical modules, wherein at least one, but preferably each electrical module includes a filter 100 according to the present invention. In this arrangement, each module preferably receives electrical power and communications signals on the powered communications bus 116. A primary DC isolator is provided externally to the modules, so an on-board isolator 400 is not necessarily included in each module, though such isolator 400 may be included and not used, or included as a low current isolator to isolate power for the power supply 200 that powers the radio modem 110. In such case of a low current isolator 400, the power connection 118 may not be included. This external primary DC isolator wiring topology may be advantageous in a situation in which application modules are desirable on an apparatus that includes an existing power bus supplied by a battery or generator. The power bus may be distributed over a particular area, such as throughout the body of a vehicle, and it may be desirable to attach various application modules at various locations throughout that vehicle. The modules may tap into existing, distributed power bus, thereby converting such bus into a combined power and communications bus 116. The modules could perform independent or coordinated application functions, such as sensing. Additional modules could be added on the bus 116 in such plug and play fashion.

provides an alternative wiring topology, including a main bower bus 118, which may be supplied by a battery or generator. Like the topology in FIG. 3A, at least one, but preferably each electrical module includes a filter 100 according to the present invention. Modules may then be daisy chained along a combined power and communications bus 116. In this topology, each module may include its own DC isolator 400, transient protection 300, and power supply 200, as previously discussed. This topology may be advantageous where an accessory is to be added to a device having an existing power bus 118, wherein the accessory itself includes a plurality of application modules. This topology limits the number of connections required into the existing power bus 118.

Figure 4:
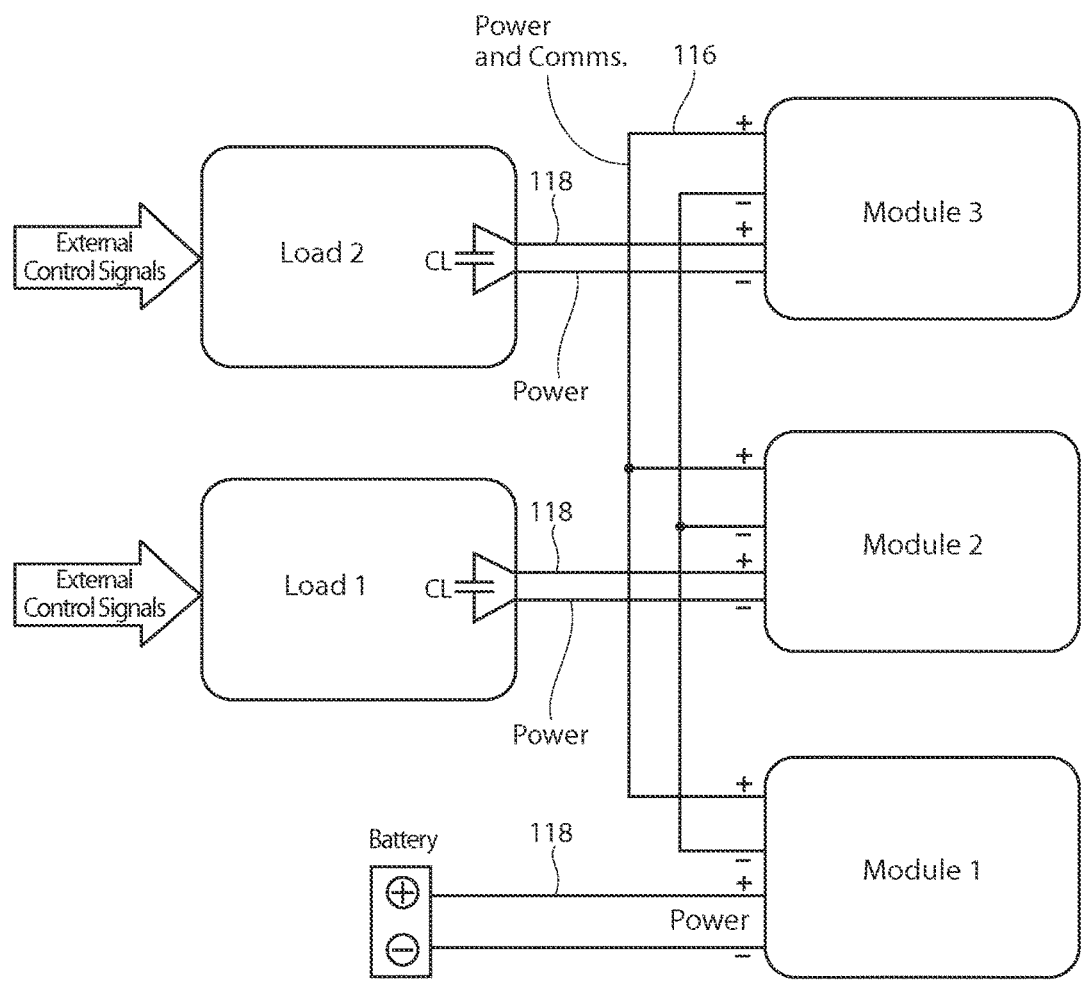
FIG. 4 is the schematic of FIG. 3B, further including non-communicative loads.

Turning now to FIG. 4, it may be advantageous to supply one or more electrical loads with power, but to allow operation of one or more such loads to be controlled by native external control signals. As can be seen by a comparison to FIG. 3B, this topology includes the wiring topology of FIG. 3B, but further includes power busses 118 supplied from Modules 2 and 3, each to a different load. For instance, there may be existing, predetermined, standardized, or even governmentally regulated controls for preferred electrical loads for a given application. In other words, for example, a certain type of switch (control) may be required by specification to control a certain type of light on a military vehicle. However, it may be desirable to add an application module to the vehicle near such light and to allow the module to supply the power to the light so as to eliminate the need of running additional power lines from the battery or generator. Thus, while the power is supplied to the load by the application module, the control of the load (e.g., on/off) is provided by other external controls, such as a switch. Such military vehicles may include wheeled vehicles (e.g. trucks and motorcycles), tracked vehicles (e.g., tanks and earth moving equipment), fixed wing aircraft (e.g. cargo and fighter planes), and rotary wing aircraft (e.g. helicopters). Other applications include use on emergency vehicles, such as fire trucks (e.g. engines, tankers, ladders), ambulances, squad cars, and police motorcycles. The combination of various lighting and power requirements and system stress (including electromagnetic noise) experienced in such systems make them suitable for use of systems and methods according to the present invention.

Figure 5:
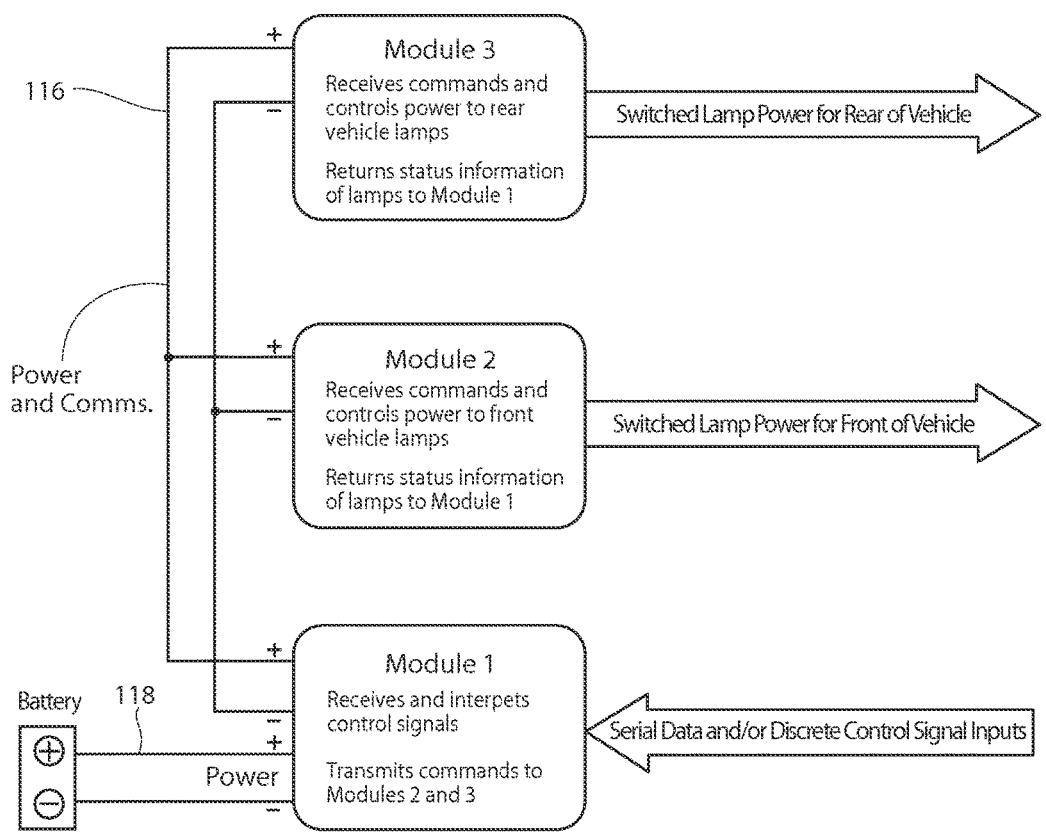
FIG. 5 is the schematic of FIG. 3B, further including control interfaces.

FIG. 5 includes the wiring topology of FIG. 3B, further providing the ability for one or more application modules to control operation of one or more electrical loads. Whereas, in the FIG. 4 topology, while power was supplied by application modules to electrical loads, control was provided by native or alternative controls (e.g. switches), this FIG. 5 topology eliminates the need for such additional hardware. For instance, a first application module, Module 1, may be independently programmed or may receive control signals from another control device, such as a simple switch or application module controller (not shown) that may send serial communications control signals. Module 1 may control or program the operation of one or more other application modules coupled to the communication bus 116, which may be a combined power and communications bus. An applications module may have a single dedicated control function (e.g. switching lamp power for the front or rear lamps on a vehicle) or a plurality of functions, such as to supply power to electrical loads at predetermined times, where such loads may be relatively positioned on a portion or a vehicle, such as within a certain half or quadrant of a vehicle body. Additionally or alternatively, the application modules may further communicate with each other, such as one or more application modules providing status updates or other data to one or more of the other application modules.

Figure 6:
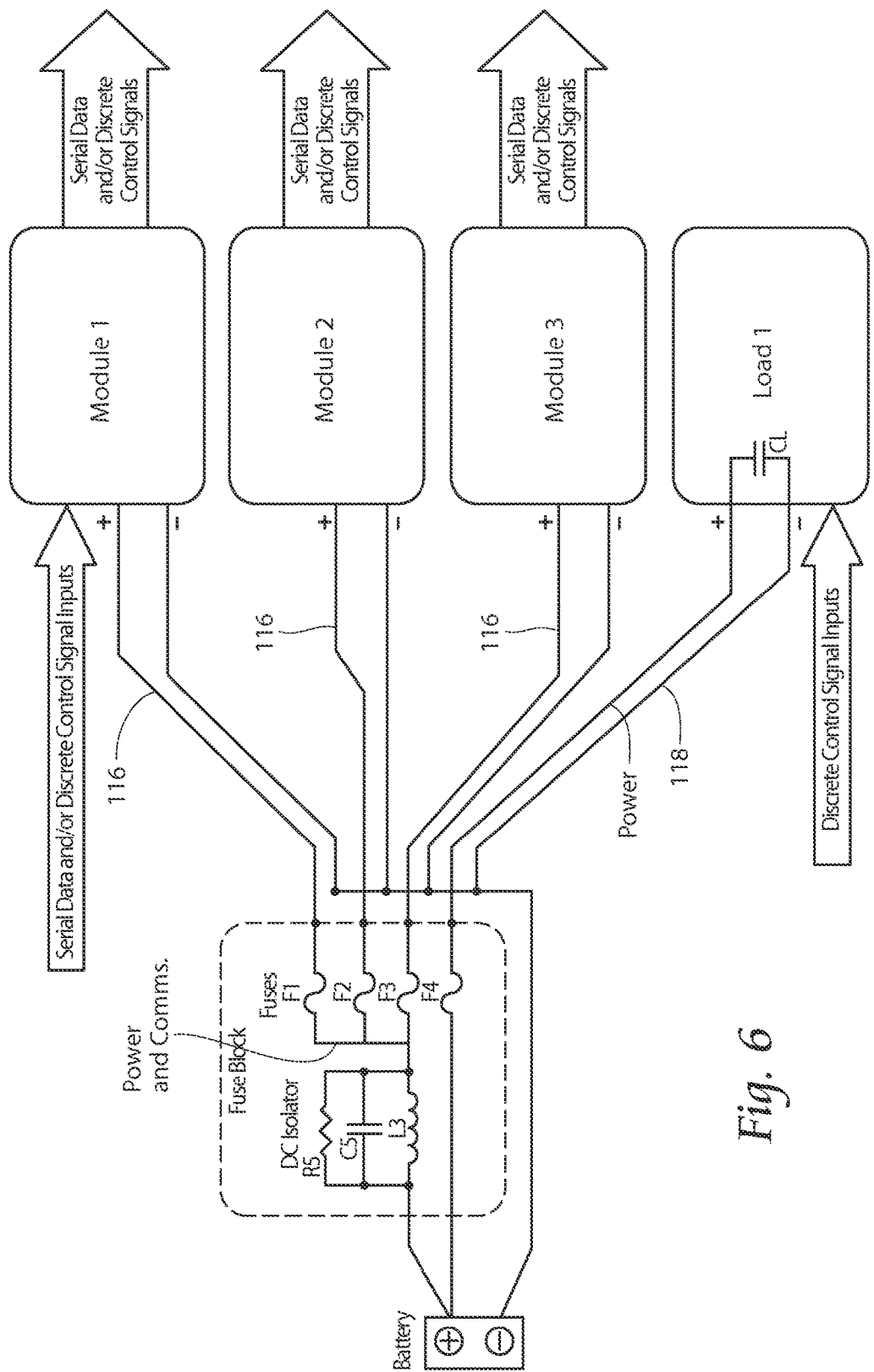
FIG. 6 is the schematic of FIG. 3A, further including a fuse block and a non-communicative load.

FIG. 6 is the wiring topology of FIG. 3A, with the addition of fuses inline with the combined power and communications bus 116 between the external DC isolator and preferably each application module, and further including a fused power bus 118 to supply power to a noncommunicative load. In this manner, power and control of the noncommunicative load is provided as is conventional in (e.g., vehicular) electrical load control, such as with a battery and switch. As with the topology in FIG. 5, at least one of the modules, Module 1, may be independently programmed or may receive control signals from another control device, such as a simple switch or application module controller (not shown) that may send serial communications control signals. Module 1 may control or program the operation of one or more other application modules coupled to the communication bus 116, which may be a combined power and communications bus. An applications module may have a single dedicated control function (e.g. switching lamp power for the front or rear lamps on a vehicle) or a plurality of functions, such as to supply power to electrical loads at predetermined times, where such loads may be relatively positioned on a portion of a vehicle, such as within a certain half or quadrant of a vehicle body. Additionally or alternatively, the application modules may further communicate with each other, such as one or more application modules providing status updates or other data to one or more of the other application modules.

At least one, but preferably all three, of the following functions are provided by a filter according to the present invention. A filter according to the present invention may provide immunity to or minimize the effect of voltage spikes on a power line to allow communication as much as possible during noise events and prevent damage to components including Radio Modem IC. A filter according to the present invention may additionally or alternatively filter a power line signal with high pass and low pass filters to allow communicative signal reception on noisy power lines. A filter according to the present invention may additionally or alternatively filter a communicative signal transmitted from a radio modem with low pass filters to prevent high frequency harmonics and spurious signals from being conducted into and thereafter radiated from the power line.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. An electrical circuit comprising:
    a signal wire configured to conduct an electrical signal, said signal wire conducting power and communications and transient signals;
    high-pass filter coupled to a transmitter and a receiver, said high-pass filter connected to the signal wire, the high-pass filter being capable of removing low-frequency components of the electrical signal below a predetermined low-frequency threshold;
    a low-pass filter connected to the high-pass filter, the low-pass filter protected from transient signal a second clamp capable of clamping electrically fast transient pulse components of the electrical signal being capable of removing high-frequency components of the electrical signal above a predetermined high-frequency threshold;
    a first voltage clamp connected to the low-pass filter, the first voltage clamp being capable of clamping a voltage level of the electrical signal at a maximum predetermined threshold voltage; said second clamp protecting said low-pass filter from transient signals and,
    a common mode choke protected from said transient signals by the first voltage clamp.

2. An electrical circuit according to claim 1, further comprising a radio modem coupled to the choke.

3. An electrical circuit according to claim 1, wherein the low-frequency threshold is about 1 MHz.

4. An electrical circuit according to claim 1, wherein the high-frequency threshold is about 10 MHz.

5. An electrical circuit according to claim 4, wherein the low frequency threshold is about 1 MHz.

6. An electrical circuit according to claim 1, further comprising a direct current isolator connected to the signal line and capable of supplying a direct current to a load.

7. A system comprising:
    a plurality of electrical circuits according to claim 1, wherein each signal line of each of the plurality of electrical circuits is electrically connected to the signal line of every other electrical circuit.

8. A system according to claim 7, comprising three of the electrical circuits according to claim 1.

9. A system according to claim 8, wherein all of the electrical circuits are carried by a vehicle.

10. A system according to claim 9, wherein the vehicle is a military vehicle.

11. A system according to claim 9, wherein the vehicle is an emergency response vehicle.

12. A system according to claim 9, wherein at least one of the electrical circuits is capable of controlling the operation of lamp power on the vehicle.

* * * * *

UNITED STATES PATENT AND TRADEMARK OFFICE
CERTIFICATE OF CORRECTION

PATENT NO.       : 10,348,418 B1
APPLICATION NO.  : 14/716380
DATED            : July 9, 2019
INVENTOR(S)      : Brian S. Olmstead Page 1 of 1

It is certified that error appears in the above-identified patent and that said Letters Patent is hereby corrected as shown below:

In the Claims

Claim 1, Column 7, Line 19, "high-pass..." should read - a high-pass... -.
Claim 1, Column 7, Line 25, "...signal a second..." should read - signals by a second... -.

Signed and Sealed this
Fifth Day of May, 2020

Andrei Iancu
*Director of the United States Patent and Trademark Office*